United States Patent [19]

Ambrose et al.

[11] Patent Number: 5,746,402
[45] Date of Patent: May 5, 1998

[54] SLIDING POINTING DEVICE TRAY

[76] Inventors: Frederic C. Ambrose, 142 The Channel, Brewster, Mass. 02631; David Hawley, 108 Chase Hill Rd., Sterling, Mass. 01564

[21] Appl. No.: 613,857

[22] Filed: Mar. 11, 1996

Related U.S. Application Data

[63] Continuation-in-part of Ser. No. 556,593, Nov. 13, 1995.

[51] Int. Cl.⁶ .................................................. B68G 5/00
[52] U.S. Cl. ........................... 248/118; 108/102; 108/143; 248/918
[58] Field of Search ................... 248/118, 118.1, 248/118.3, 118.5, 918; 400/715, 717; 108/102, 143

[56] References Cited

U.S. PATENT DOCUMENTS

| | | |
|---|---|---|
| 652,567 | 6/1900 | Nesse . |
| 942,366 | 12/1909 | Deeter . |
| 4,913,387 | 4/1990 | Tice ............................ 400/717 X |
| 5,009,379 | 4/1991 | Sadler . |
| 5,203,527 | 4/1993 | Rubey ............................ 248/118 |
| 5,316,249 | 5/1994 | Anderson ...................... 248/146 |
| 5,346,164 | 9/1994 | Allen ............................. 248/118 |
| 5,358,208 | 10/1994 | Moseley ..................... 248/918 X |
| 5,413,294 | 5/1995 | Greenquist ................. 248/918 X |
| 5,433,407 | 7/1995 | Rice ............................. 248/118.1 |
| 5,443,237 | 8/1995 | Stadtmauer ............... 248/118.3 X |
| 5,470,040 | 11/1995 | Bhagat et al. .............. 248/918 X |
| 5,490,647 | 2/1996 | Rice ............................. 248/118.1 |
| 5,562,270 | 10/1996 | Montague .................... 248/118.1 |

OTHER PUBLICATIONS

Alimed Catalog, pp. cover sheet, 2–18, Issue 1 (1997).
Alimed Catalog, p. 7 (Undated).

*Primary Examiner*—Ramon O. Ramirez
*Attorney, Agent, or Firm*—Testa, Hurwitz & Thibeault, LLP

[57] ABSTRACT

Disclosed is a system for positioning a computer mouse relative to a computer keyboard. The system comprises a keyboard support tray having a support surface and a rear wall. The support surface has a front portion and a rear portion and is adapted to support the keyboard. The keyboard support tray further comprises a slot disposed in the rear wall. The system further comprises a palm rest connected to the front portion of the keyboard support tray. The system further comprises a pointing device positioning member having a support surface, a first end, and a second end. The first end of the pointing device positioning member is slidably disposed upon the palm rest while the second end is slidably engaged within the slot of the keyboard support tray. In operation, an operator may slide the pointing device positioning member to any one of a variety positions above the computer keyboard.

2 Claims, 10 Drawing Sheets

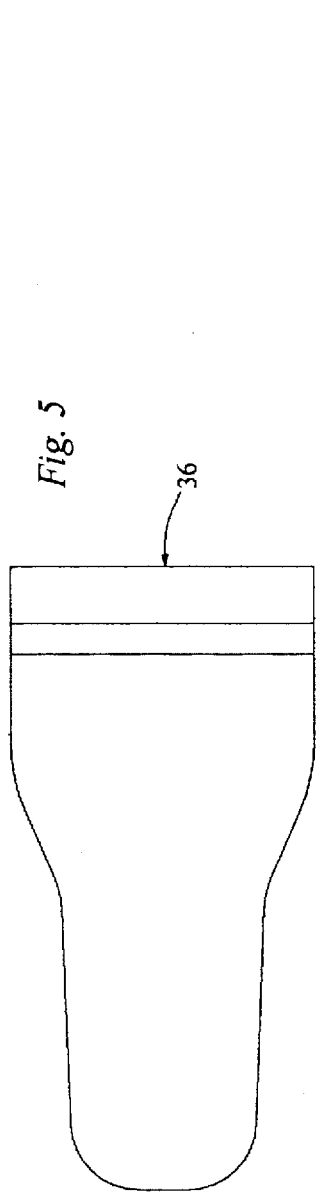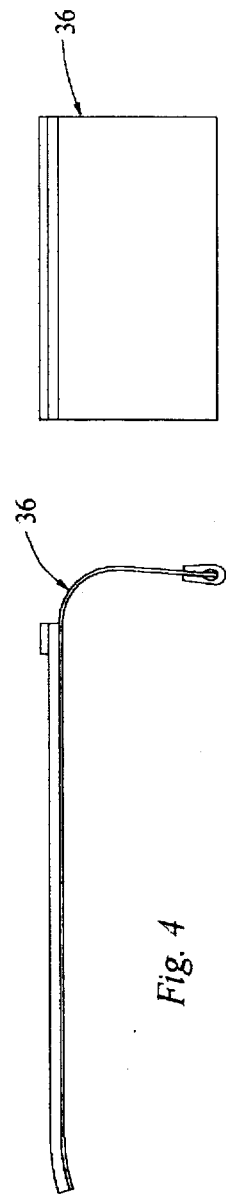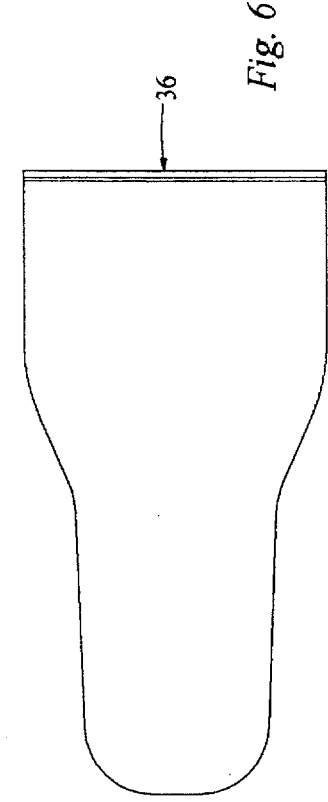
Fig. 3
Fig. 4
Fig. 5
Fig. 6

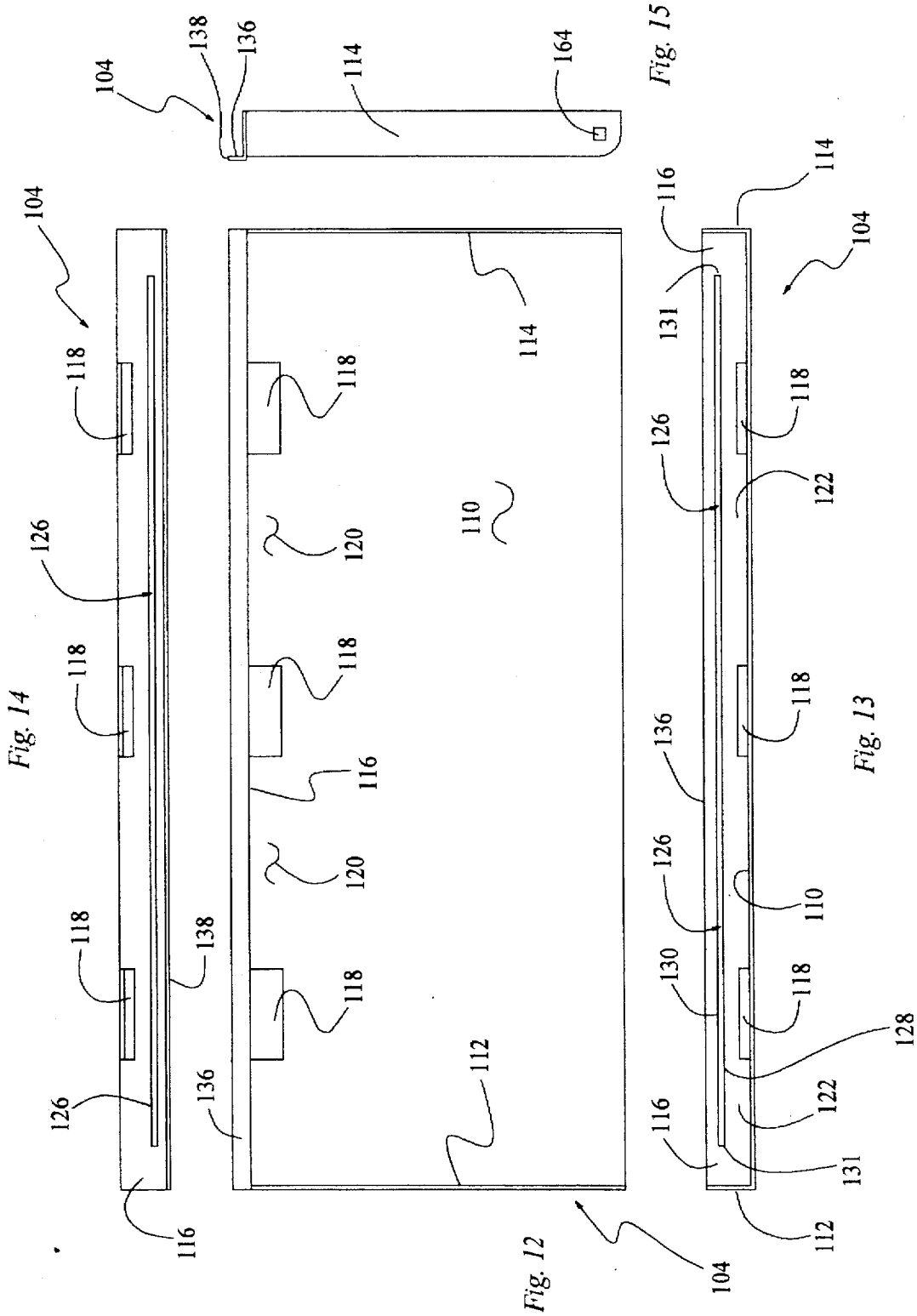

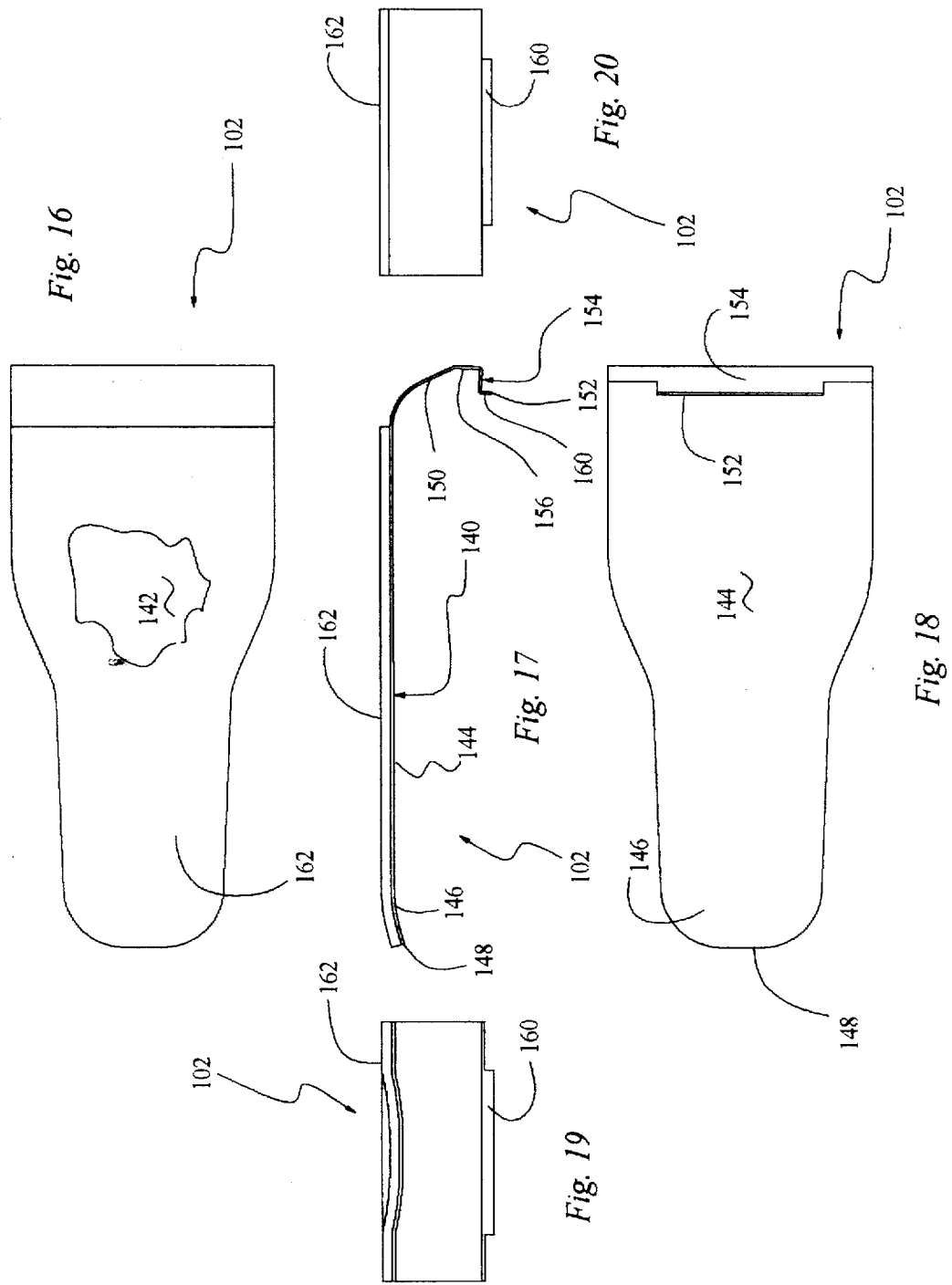

SLIDING POINTING DEVICE TRAY

This application is a continuation-in-part of application Ser. No. 08/556,593 filed on Nov. 13, 1995.

FIELD OF THE INVENTION

The present invention relates generally to ergonomic computer equipment. More specifically, the present invention relates to a device for supporting and selectively positioning an electronic pointing device such as a computer mouse relative to a computer keyboard.

BACKGROUND OF THE INVENTION

The use of electronic pointing devices such as computer mouses in connection with computer keyboards and terminals is well known. A few devices have been developed which allow the mouse to be positioned relative to the keyboard. For example, U.S. Pat. No. 5,413,294 discloses a platform 402 that supports a mouse and which is mounted by velcro strips directly to the computer keyboard.

Devices of the type exemplified by U.S. Pat. No. 5,413,294 have several drawbacks. First, such devices do not allow the mouse to readily moved above the keyboard. Second, such devices are configured to attach directly to the keyboard and as such some deformation and/or modification of the keyboard is required. Third, such devices are not uniquely designed for use with a mouse. As such, some operators of the device will ultimately incur discomfort over extended periods of use.

SUMMARY OF THE PRESENT INVENTION

One object of the present invention is to provide a device for supporting and positioning an electronic pointing device such as a mouse relative to and/or above a keyboard and/or work surface wherein the mouse can be easily moved above and about the keyboard.

Another object of the present invention is to provide a device for supporting and positioning an electronic pointing device such as a mouse relative to and/or above a keyboard and/or work surface which does not require any modifications to the keyboard.

Still another object of the present invention is to provide a device for supporting and selectively positioning an electronic pointing device such as a mouse relative to a computer keyboard which is designed for comfort over long and extended periods of use and the ability to be slid about the work surface for custom positioning independent of the keyboard.

The present invention is a device for supporting and selectively positioning an electronic pointing device such as a computer mouse relative to and/or above a computer keyboard which may be mounted on a variety of work surfaces such as a keyboard support tray or a desk. In one embodiment, the device comprises a keyboard support tray having a support surface adapted to support a keyboard, a front portion and a rear wall having a slot therein. The system further comprises a palm rest connected to the front portion of the keyboard support tray. The system further comprises a pointing device positioning member having a first end, a second end, and a support surface adapted to support a pointing device such as a computer mouse. The first end of the pointing device positioning member is slidably engaged with the palm rest while the second end is slidably engaged with the slot of the rear wall of the keyboard support tray. In operation, the pointing device positioning member may be selectively moved or slid about and along the palm rest and the slot of the rear wall of the keyboard support tray to thereby selectively position the pointing device (such as a computer mouse) above and/or relative to the computer keyboard.

BRIEF DESCRIPTION OF THE DRAWINGS

The following detailed description of the present invention will be more fully understood with reference to the accompanying drawings in which:

FIG. 3 is a front view of an ornamental design of a first embodiment of the pointing device positioning member of the present invention;

FIG. 4 is a side view of the ornamental design of the pointing device positioning member of the first embodiment of present invention;

FIG. 5 is a top view of the ornamental design of the pointing device positioning member of the first embodiment of the present invention;

FIG. 6 is a bottom view of the ornamental design of the pointing device positioning member of the first embodiment of the present invention;

FIG. 12 is a top plan view of the keyboard support tray of the fourth embodiment;

FIG. 13 is a front view of the keyboard support tray of the fourth embodiment;

FIG. 14 is a rear view of the keyboard support tray of the fourth embodiment;

FIG. 15 is a side view of the keyboard support tray of the fourth embodiment;

FIG. 16 is a top plan view of the keyboard support tray of the fourth embodiment;

FIG. 17 is a front view of the pointing device positioning member of the fourth embodiment;

FIG. 18 is a rear view of the pointing device positioning member of the fourth embodiment;

FIG. 19 is a side view of the pointing device positioning member of the fourth embodiment;

FIG. 20 is a side view of the pointing device positioning member of the fourth embodiment;

DETAILED DESCRIPTION OF THE PREFERRED EMBODIMENTS

Figure 1:
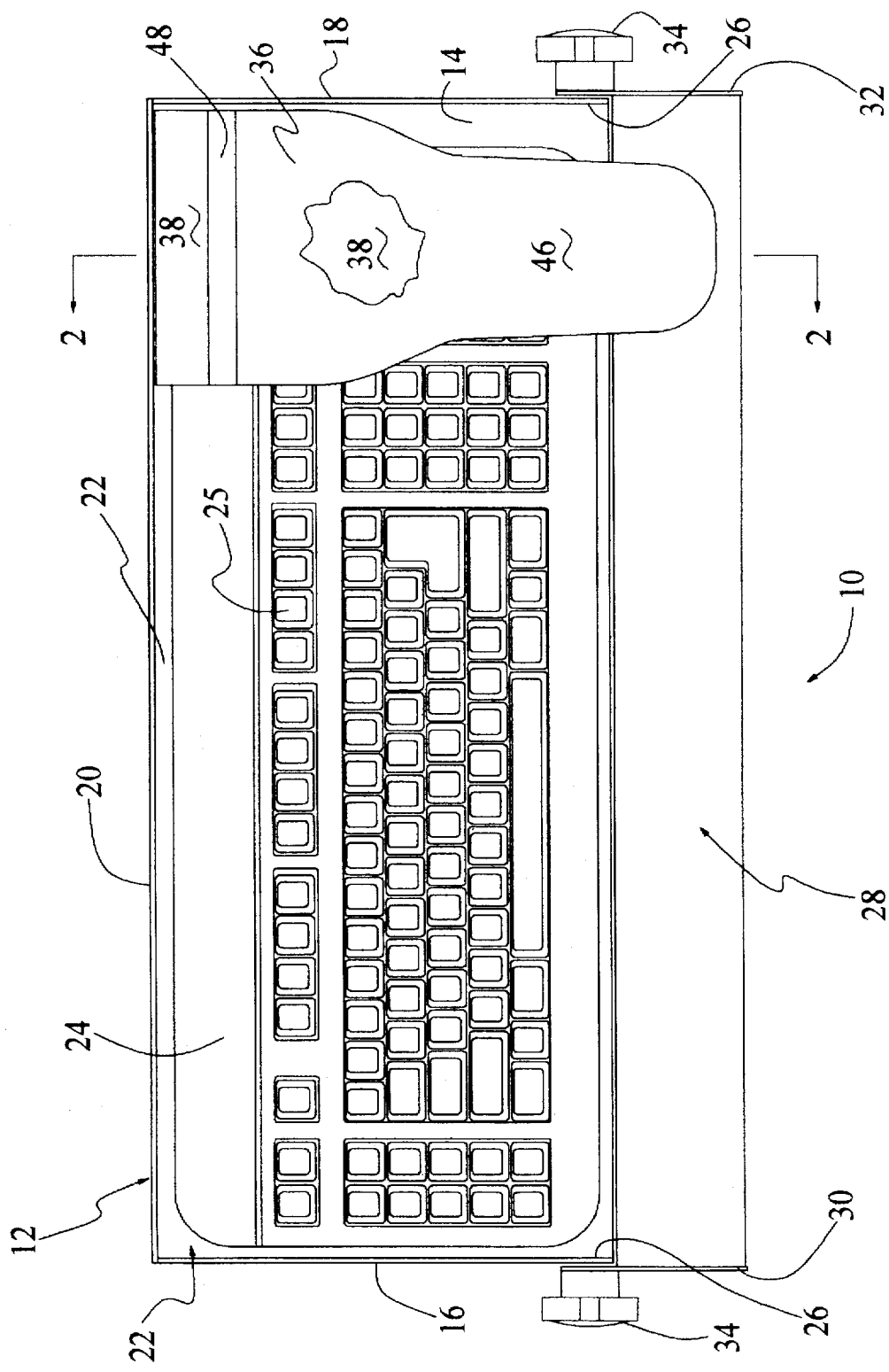
FIG. 1 is a top plan assembly view of a first embodiment of the present invention showing a pointing device positioning member slidably disposed about a palm rest and a keyboard support tray.
Figure 2:
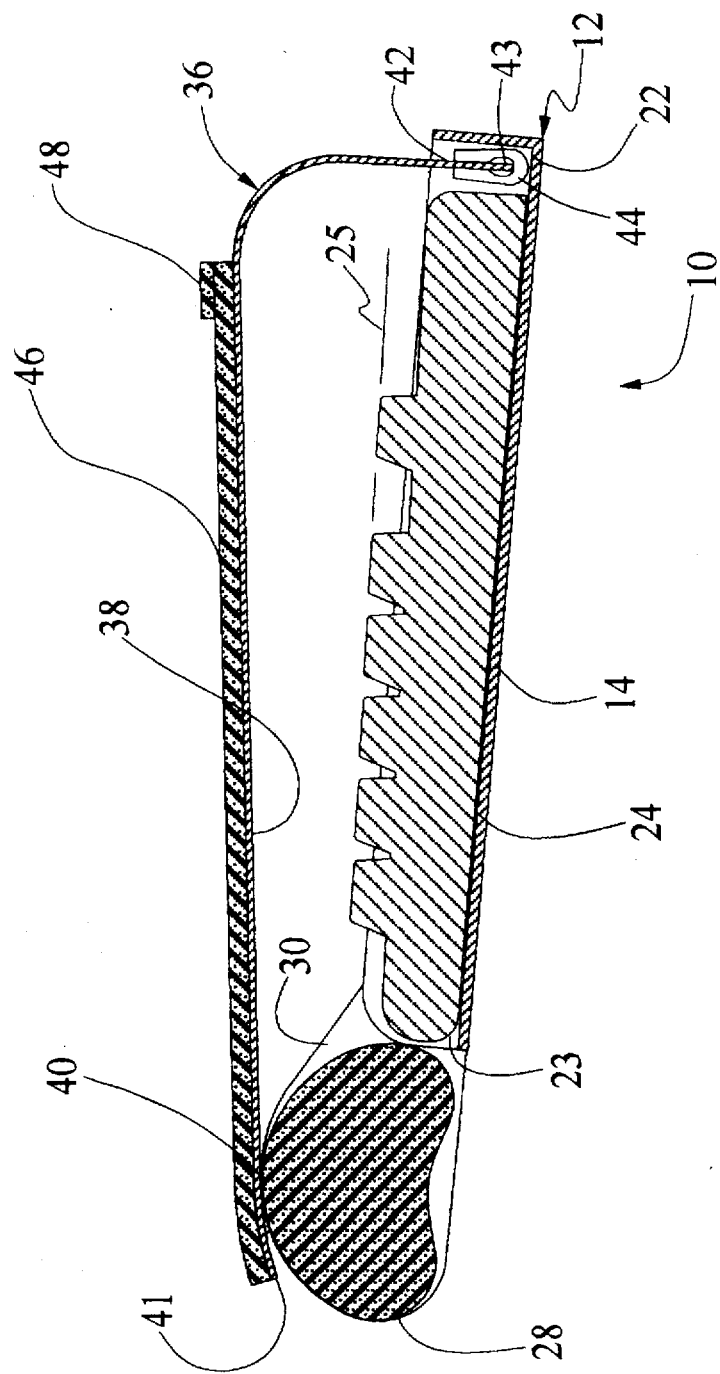
FIG. 2 is a cross section view taken along line 2—2 of FIG. 1.
Figure 7:
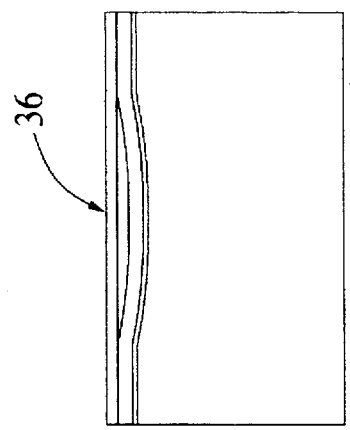
FIG. 7 is a rear view of the ornamental design of the pointing device positioning member of the first embodiment of the present invention.
Figure 8:
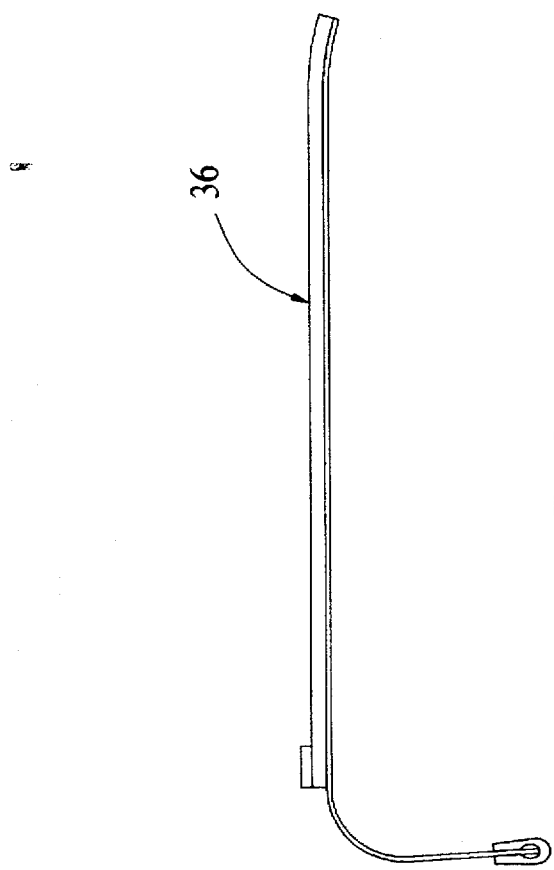
FIG. 8 is a side view of the ornamental design of the pointing device positioning member of the first embodiment of the present invention.

Referring to FIGS. 1–3, wherein a first embodiment of the system 10 comprises a keyboard support tray 12 having a support surface 14, side walls 16 and 18, a rear wall 20. The support surface 14 has a rearward portion 22 and is adapted to support a keyboard 24 having a facial surface 25. The sidewalls 16 and 18 have a front portion 26.

The system 10 further comprises palm or wrist rest 28 having ends 30 and 32 which are connected to the keyboard support tray 12 at the front portion 26 by conventional means such as a knob 34.

The system 10 further comprises a pointing device positioning member 36 having a support surface 38, a first end 40 terminating in a leading edge 41 and a second end 42 terminating in a leading edge 43. The pointing device positioning member 36 further comprises a bearing or grommet member 44 mounted upon the second end 42 and edge 43. The bearing or grommet member 44 is preferably made from a plastic guide strip and is generally provided to enhance the ability of the second end 42 to slide along the rearward portion 22 and to prevent deformation and/or scratching of the rearward portion 22. The pointing device positioning member 36 may further comprise a first cushion member 46 mounted to the support surface 38 which is adapted to engage with a computer mouse (not shown) or other computer pointing device. The pointing device positioning member 36 further comprises a second cushion member 48 mounted at a rearward end of the first cushion member 46. The second cushion member 48 is adapted to act as a barrier to prevent a computer mouse (not shown) or other computer pointing device from sliding off the pointing device positioning member 36 during use and/or storage. The first and second cushion members 46 and 48 are made from pliable materials such as neoprene. In the embodiment of FIGS. 1 and 2 and the construction and operative position of the palm rest 28 and the keyboard support tray 12 allow the first end 40 to be substantially parallel to that of the support surface 38 while the second end 42 may be positioned substantially perpendicular to that of the support surface 38. As will be readily apparent, the pointing device positioning member 36 may be designed and constructed in a variety of ways depending upon the design of the palm rest 28 and the keyboard support tray 12 or whether the keyboard 24 is simply mounted upon a desk surface. In operation, the pointing device positioning member 36 may be selectively moved or slid about and along the palm rest 28 and the rear portion of the keyboard support tray 22 to thereby selectively position the pointing device (such as a computer mouse) above and/or relative to the keyboard 24.

FIGS. 3–8 show one embodiment of the ornamental design of the pointing device positioning member 36 as depicted in FIGS. 1 and 2.

Figure 9:
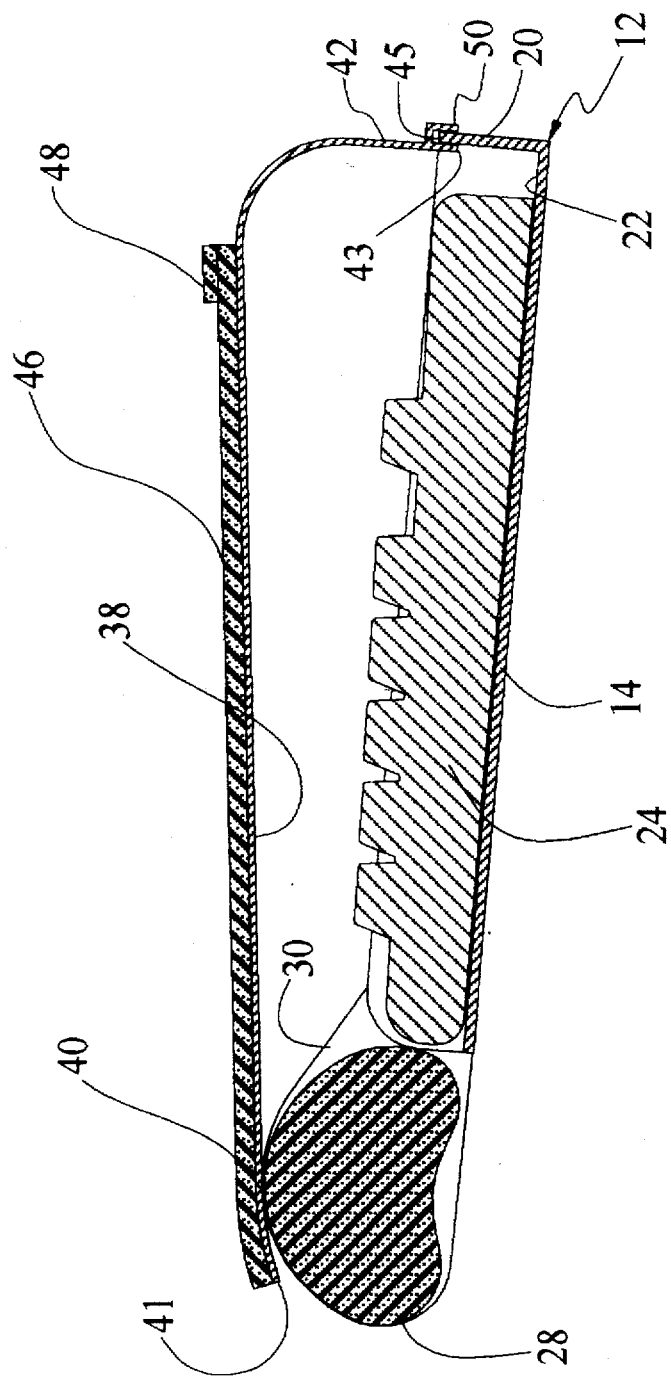
FIG. 9 is a cross-section view showing a second embodiment of the present invention.

FIG. 9 shows a second embodiment of the system 10 and of the pointing device positioning member 36. In this embodiment, the bearing member 44 has been removed and a channeled or flange member 50 is formed with the second end 42 to form a channel which is adapted to slidably engage with the rear wall 20 of the keyboard support tray 12.

Figure 10:
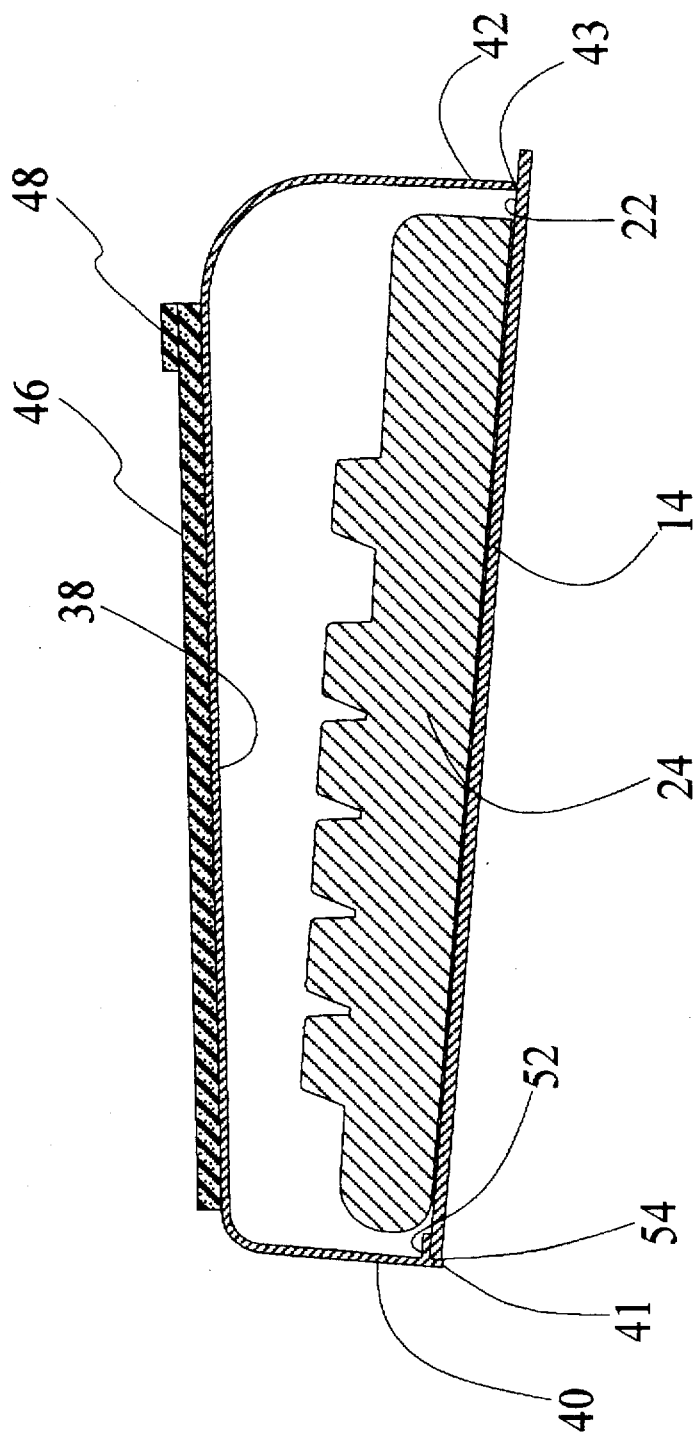
FIG. 10 is a cross-section view showing a third embodiment of the present invention.

FIG. 10 shows a third embodiment of the system 10 and of the pointing device positioning member 36. In this embodiment, the second end 42 and leading edge 43 is adapted to slidably engage directly with the rearward portion 22 of the support surface 14. In this embodiment, the first end 40 is formed with a flange portion 52 which along with the edge 41 is adapted to slidably engage with a leading edge 54 of the support surface 14 of the keyboard support tray 12.

Although not shown, the pointing device positioning member 36 has been described with reference to a computer keyboard 24 mounted on a support surface 14 of a keyboard support tray 12, it should be understood that the support surface 14 may constitute any type of work surface such as desk. In this embodiment, the pointing device positioning member 36 may, for example, be used with a keyboard 24 which is mounted directly on a desk surface and could be designed such that the first end 40 and the second end 42 are in slidable engagement with the desk surface.

The pointing device positioning member 36 of the present invention may take a variety of designs and be constructed in a variety of ways. By way of example only consider the following:

(1) the pointing device positioning member 36 could be designed such that the first end 40 is not parallel to the support surface 38. This non-parallel feature might be necessary if for example the palm rest 28 were positioned below and/or adjacent the keyboard 24 rather than above the keyboard 24 as shown in FIGS. 1–2 and 9. Further, such a non-parallel feature might be necessary if the palm rest 28 were positioned at an extreme position above the keyboard 24;

(2) the first end 40 of the pointing device positioning member 36 might also be designed to slidably engage with a portion of the keyboard support tray 12 itself rather than the palm rest 28 which could be removed in its entirety. By way of example, the first end 40 of the pointing device positioning member 36 might be curved downward and slidably engage with a portion of the support surface 14 which is adjacent to and in front of the keyboard 24;

(3) the second end 42 does not necessarily have to be substantially perpendicular to that of the support surface 38. By way of example only, if the rearward portion 22 of the keyboard support surface 14 were of larger dimensions, then the second end 42 could be at an angle less than perpendicular to that of the support surface 38;

(4) although the first end 40, the support surface 38 and the second end 42 have been shown of integral construction, the first end 40, support surface 38 and the second end 42 might be constructed of non-integral parts;

(5) the pointing device positioning member 36 may be made from a variety of materials such as steel or plastic and formed by a variety of processes such as conventional bending or injection molding processes;

(6) the bearing or grommet member 44 is mounted to the second end 42 and is in direct slidable contact with the rearward portion 22. Alternatively, the bearing member 44 could be discarded and the second end 42 could be in direct slidable contact with the rearward portion 22; and (7) the second end 42 and edge 43 may be constructed to have one or more rollers or wheels disposed therein to thereby further enhance the ability of the pointing device positioning member 36 to slide upon the keyboard support tray 12.

Similarly, the keyboard support tray 12 and the palm rest 28 may take a variety of designs and be constructed in a variety of ways. By way of example, consider the following:

(1) the palm rest 28 may be fixed or movably connected or formed integral to the keyboard support tray;

(2) the palm rest 28 may be positioned below, adjacent to and/or above a keyboard mounted on the keyboard support tray;

(3) the keyboard support tray 12 may be part fixed or moveable in either a positive or negative tilt orientation;

(4) the keyboard support tray 12 may be part of a mechanism which positions the keyboard below a work surface such as a desk;

(5) the keyboard support tray 12 may be part of a mechanism which allows the keyboard support tray 12 to be stored within a housing;

(6) the keyboard support tray 12 may be part of a mechanism which positions the keyboard above and/or on a work surface such as a desk;

(7) the keyboard support tray 12 itself might be mounted directly on a surface such as a desk;

(8) although the keyboard support tray 12 has been shown as an integral unit, the keyboard support tray 12 might be comprises of separate parts;

(9) although in the embodiment shown, the keyboard support tray 12 simply supports a keyboard 24, the keyboard support tray 12 might be designed to be adjustable to accommodate a variety of differently sixed keyboards; and

(10) the keyboard support tray 12 has been shown with a generally rectangular shape and sized slightly larger than the keyboard 24 while allowing sufficient space for an unobstructed rearward portion 22 so that the second end 42 of the pointing device positioning member 36 can be readily slidable thereon. Alternatively, the keyboard support tray 12 could have significantly larger dimensions than the keyboard 24 to allow the pointing device positioning member 36 to be designed differently and/or have a greater range of movement. By way of example only, the keyboard support tray 12 might be designed with a very wide dimension as compared with the width of the keyboard 24 thereby allowing the pointing device positioning member 36 to be slidably moved to a position on either side of the keyboard 24.

Figure 11:
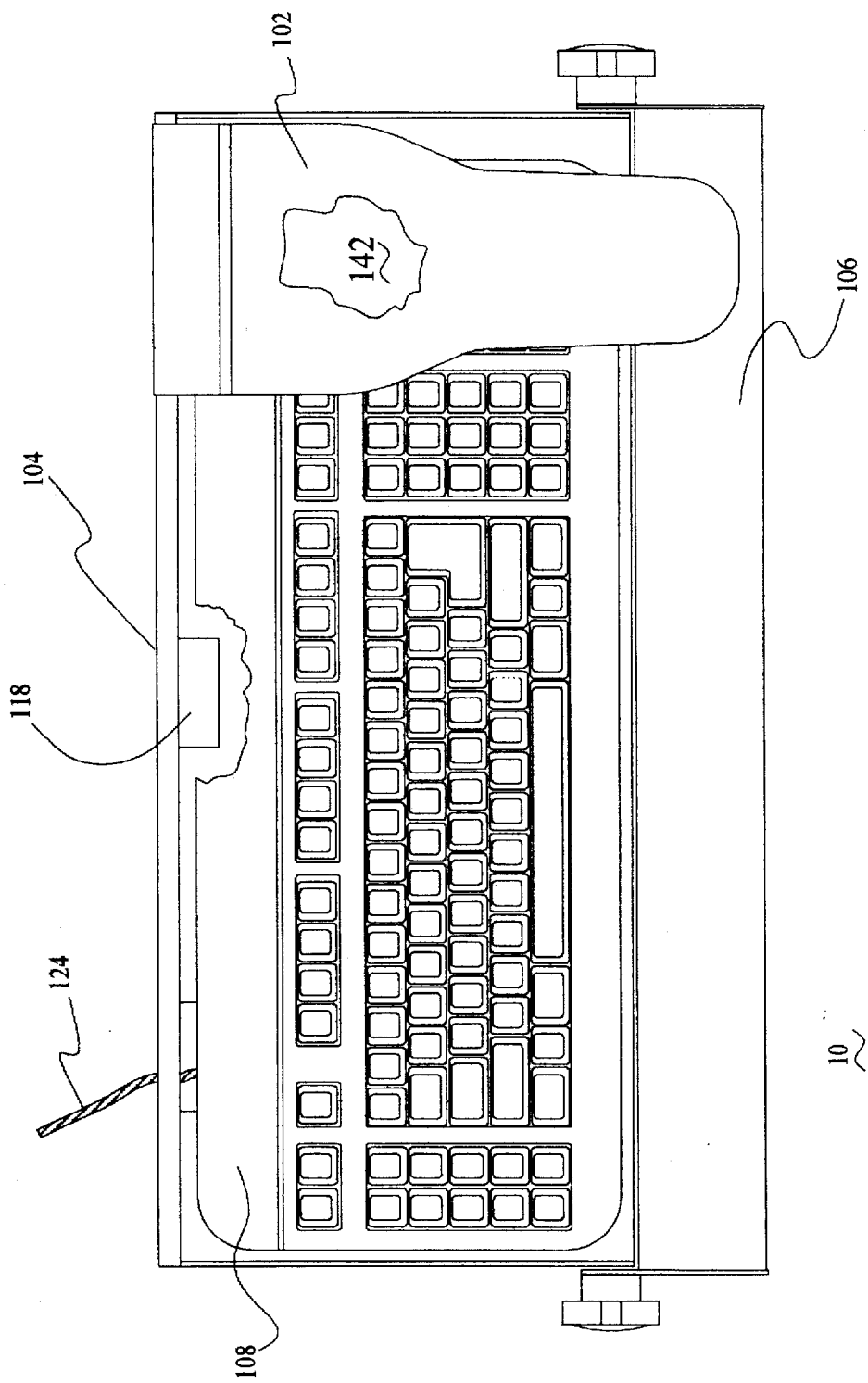
FIG. 11 is a top plan assembly view showing a fourth embodiment of the present invention showing a pointing device positioning member slidably disposed about a palm rest and a keyboard support tray.

Referring to FIG. 11, where a fourth embodiment of the system 100 is shown generally comprising a pointing device positioning member 102 moveably engagable with a keyboard support tray 104 and a palm rest 106 to allow an operator to move the pointing device positioning member 102 to any one of a variety of positions above a computer keyboard 108.

Referring to FIGS. 12–15, wherein the keyboard support tray 104 is shown comprising a support surface 110, side walls 112 and 114, and a rear wall 116. The support surface 110 is adapted to support the computer keyboard 108. The keyboard support tray 104 further comprises a plurality of openings 118 located at a rearward portion 120 of the support surface 110 and lower portion 122 of the rear wall 116. The openings 118 are adapted to allow a cable 124 of the computer keyboard 108 to pass therethrough without interference when the operator positions the pointing device positioning member 102 above the computer keyboard 108. The keyboard support tray 104 further comprises a slot 126 extending substantially the length of the rear wall 116 to allow the pointing device positioning member 102 to slide above the entire length of the computer keyboard 108. The slot 126 is defined by a lower edge 128, an upper edge 130, and side edges 131. The slot 126 is generally sized to allow the pointing device positioning member 102 to freely slide therein. The keyboard support tray 104 further comprises a protrusion or bracket portion 136 terminating in a leading edge 138. In the embodiment shown, the protrusion portion 136 extends outward from and substantially perpendicular to the rear wall 116. In the embodiment shown, the protrusion portion 136 is integral to the rear wall 116 and extends outward from the uppermost portion of and the entire length of the rear wall 116. As will be described more fully herein, the protrusion portion 136 and leading edge 138 act as a bearing surface to limit the movement of the pointing device positioning member 102. The keyboard support tray 104 further comprises slots 164 located on each side wall 112, 114 which are adapted to allow engagement of the palm rest 106 to the keyboard support tray 104. The keyboard support tray 104 may be made from a variety of material and manufacturing processes. In the preferred embodiment, the keyboard support tray 104 is made from sheet metal and formed by conventional bending operation to form an integral unit.

Referring to FIGS. 16–20, wherein the pointing device positioning member 102 is shown comprising a support member 140 having an upper surface 142 and a lower surface 144. The pointing device positioning member 102 further comprises a first end portion 146 integral to the support member 140 and terminating in a leading edge 148. The pointing device positioning member 102 further comprises a second end portion 150 integral to the support member 140 and terminating in a leading edge 152. The pointing device positioning member 102 further comprises a substantially planar bearing portion 154 positioned integral to and between the second end portion 150 and the leading edge 152. As will be described more fully herein, the bearing portion 154 is adapted to slidably engage with the slot 126 of the keyboard support tray 104. The pointing device positioning member 102 further comprises a rearward stop portion 156 positioned integral to and between the second end portion 150 and the bearing portion 154. In the embodiment shown, the rearward stop portion 156 is substantially perpendicular to the bearing portion 154. The pointing device positioning member 102 further comprises a substantially planar frontward stop portion 160 positioned integral to and between the bearing portion 154 and the leading edge 152. In the embodiment shown, the frontward stop portion 160 is substantially perpendicular to the bearing portion 154 and substantially parallel to the rearward stop portion 156. As will be described more fully herein, the rearward stop portion 156 and the frontward stop portion 160 are adapted to engage with the leading edge 138 of the protrusion 136 and the rear wall 116, respectively, of the keyboard support tray 104 to thereby set minimum and maximum frontward and backward movements of the pointing device positioning member 102 to and away from the operator of the keyboard 108. The pointing device positioning member 102 may further comprise a cushion member 162 mounted to the upper surface 142 of the support member 140. The cushion member 162 is generally adapted to engage with a computer mouse (not shown) or other computer pointing device. The cushion member 162 is preferably made from a pliable material such as neoprene. The pointing device positioning member 102 may be made from a variety of material and manufacturing processes. In the preferred embodiment, the pointing device positioning member 102 is made from sheet metal and formed by conventional bending operation to form an integral unit.

Figure 21:
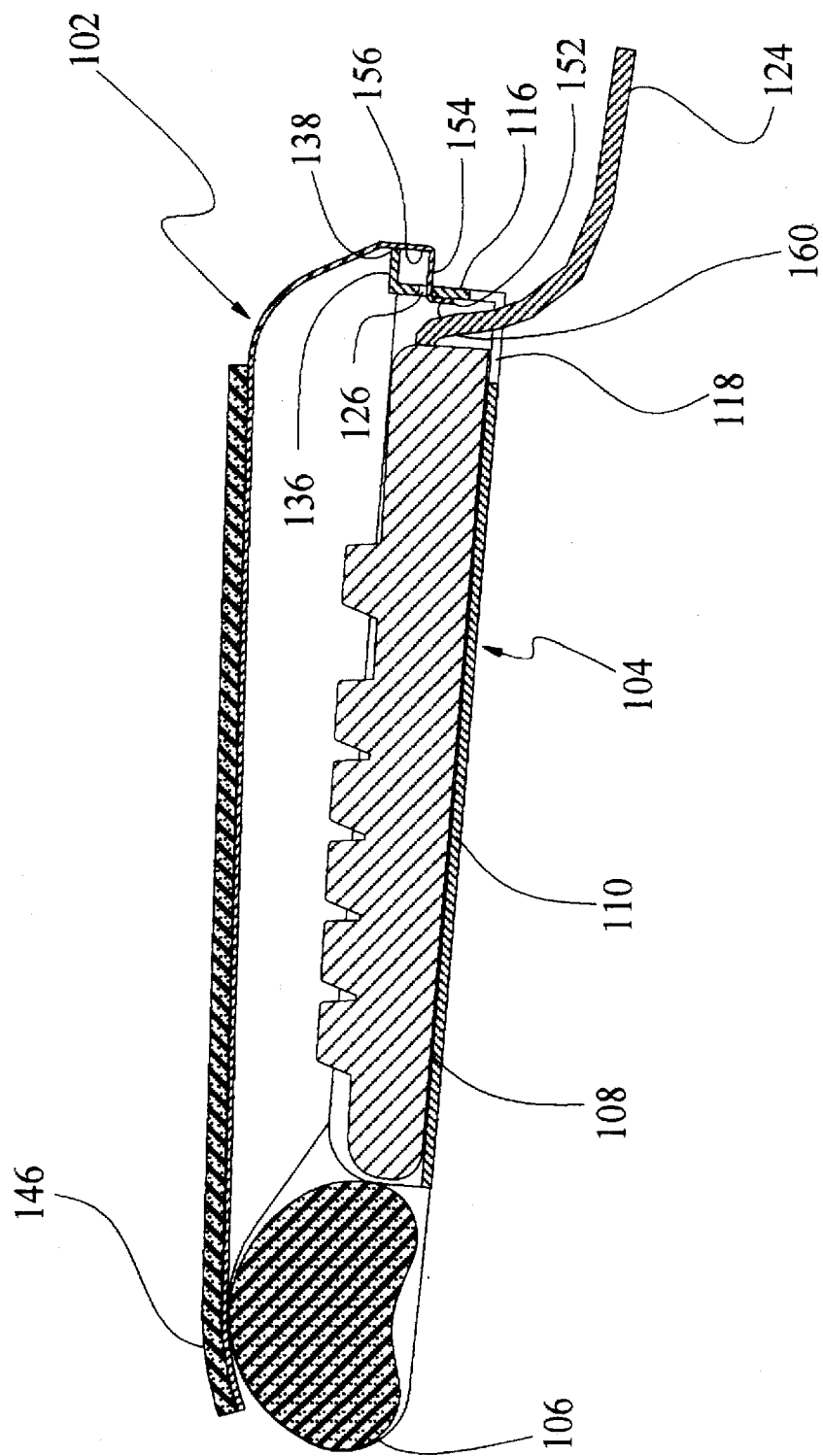
FIG. 21 is a cross section view of the fourth embodiment of the present invention.

Referring to FIG. 21, where a cross-section view of the system 100 shows the pointing device positioning member 102 engaged with the keyboard support tray 104. As further shown, the first end portion 146 of the pointing device positioning member 102 is engaged with the palm rest 106 while the bearing portion 154 is slidably engaged within the slot 126 and upon edge 128. In operation, the computer keyboard 108 is mounted upon the support surface 110 of the keyboard support tray 104 and the cable 124 is passed through one of the openings 118 of the keyboard support tray 104. Thereafter, the pointing device positioning member 102 may be installed by inserting the leading edge 152 of the pointing device positioning member 102 through the slot 126 to a position where the bearing portion 154 is in contact with edge 128 of the slot 126. In this position, the frontward stop portion 160 may be in contact with or spaced a small distance from the rear wall 116 while the rearward stop portion 156 may be in contact with or spaced a small distance from the leading edge 138 of the protrusion 136. In operation, an operator may slide the pointing device positioning member 102 along the substantial length of the keyboard support tray 102 and selectively move the pointing device positioning member 102 to any one of a variety positions above the computer keyboard 108.

The foregoing description is intended primarily for purposes of illustration. The invention may be embodied in other forms or carried out in other ways without departing from the spirit or scope of the invention. Modifications and variations still falling within the spirit or the scope of the invention will be readily apparent to those skilled in the art.

What is claimed is:

1. A system for positioning a pointing device relative to a computer keyboard having a cable, the system comprising:

(a) a keyboard support tray having a support surface and a rear wall, said support surface having a front portion and a rear portion and being adapted to support the keyboard, said keyboard support tray further comprising a slot disposed in said rear wall;

(b) a palm rest engaged with said front portion of said keyboard support tray; and (c) a pointing device positioning member adapted to support the pointing device and having a support surface, a first end, and a second end, said first end being slidably disposed upon said palm rest and said second end being slidably engaged with said slot, whereby said pointing device positioning member may be moved about said palm rest and said slot to thereby position the pointing device to a variety of positions above the keyboard.

2. The system of claim 1, wherein said keyboard support tray further comprises at least one opening adapted to allow the cable to pass therethrough.

* * * * *